United States Patent Office 3,687,653
Patented Aug. 29, 1972

3,687,653
TRIFLUOROMETHYLBENZYL THIOLCARBA-MATES AS HERBICIDES
Frederic G. Bollinger, Copley, and John J. D'Amico, Akron, Ohio, assignors to Monsanto Company, St. Louis, Mo.
No Drawing. Filed Apr. 13, 1970, Ser. No. 28,000
Int. Cl. A01n 9/22
U.S. Cl. 71—94
19 Claims

ABSTRACT OF THE DISCLOSURE

Substituted benzyl thiolcarbamates containing fluorine are described which are useful for controlling perennial and annual grasses.

---

The invention relates to fluorobenzyl thiolcarbamates, to methods of destroying or controlling undesired vegetation and to herbicidal compositions.

BACKGROUND OF THE INVENTION

Specific benzyl thiocarbamate herbicides containing fluorine in the benzyl radical have not heretofore been described although Harman and one of us has described a method of destroying or controlling undesired vegetation by applying a toxic concentration of a halogen substituted benzyl ester of a thiocarbamic acid which halogen is preferably chlorine but bromine and to a lesser extent fluorine and iodine are also suitable. Harman and D'Amico U.S. 2,992,091, July 11, 1961. Formative action on broad leaf plants like that commonly associated with chlorophenoxyacetic acids and toxicity to a variety of annual grasses are described. Severe formative action on broad leaf plants is exerted by certain polyhalogenated benzyl thiocarbamates. However, there is a need for improved toxicants which can be used in areas of broad leaf crops, for example sugar beets, without exerting formative action, at rates effective for weed control and which control perennial grasses as well as annual grasses. The present invention is concerned with such improvements in the field of halobenzyl thiocarbamate herbicides.

The new compounds of this invention are monofluorobenzyl and mono(trifluoromethyl)benzyl thiolcarbamates wherein the amino radical is di(lower alkyl)amino of 1-4 carbon atoms in each alkyl group, diallylamino, N-allyl N-lower alkyl amino, piperidino, dimethylpiperidino, 1-pyrrolidinyl or dimethyl-1-pyrrolidinyl. These compounds exert a high degree of toxicity to quackgrass and certain other perennial grasses at low rates of application at which rates there is usually little or no effect on wheat, soybeans, sugar beets, and corn. It is preferred that the amino substituent is di-lower alkyl amino of 2 or 3 carbon atoms in each alkyl group. When piperidino is the amino substituent, it is preferred that the benzyl substituent is ortho or meta fluorobenzyl and when 1-pyrrolidinyl is the amino substituent it is preferred that the benzyl substituent is ortho or para fluorobenzyl. Illustrative compounds are 2, 3 and 4-(alpha,alpha,alpha-trifluoromethylbenzyl)-diisopropylthiolcarbamates,
2, 3 and 4-(alpha,alpha,alpha-trifluoromethylbenzyl)-diethylthiolcarbamates,
2, 3 and 4-alpha,alpha,alpha-trifluoromethylbenzyl)-di-n-propylthiolcarbamates,
2, 3 and 4-fluorobenzyl diallylthiolcarbamates,
2, 3 and 4-p-fluorobenzyl N-allyl-N-isopropylthiolcarbamates,
3-(alpha,alpha,alpha-trifluoromethylbenzyl) dimethylthiolcarbamate,
2, 3 and 4-fluorobenzyldimethylthiolcarbamates,
2, 3 and 4-fluorobenzyl diethylthiolcarbamates,
2, 3 and 4-fluorobenzyl diisopropylthiolcarbamates,
2, 3 and 4-fluorobenzyl di-n-propylthiolcarbamates,
2, 3 and 4-fluorobenzyl dibutylthiolcarbamates,
2, 3 and 4-fluorobenzyl diisobutylthiolcarbamates.

The fluoro substituted benzyl esters of this invention are prepared by condensing the corresponding benzyl halide with a salt, preferably alkali metal salt, or amine salt of the appropriate thiolcarbamic acid in aqueous or organic solvent medium. A salt of the thiolcarbamic acid is conveniently prepared by reacting carbonyl sulfide with the appropriate amine in known manner. The fluoro substituted benzyl halide is then reacted with the salt to form the desired ester. Suitable variation of the foregoing procedure is the addition of carbonyl sulfide to an alkaline mixture containing the amine and fluoro substituted benzyl halide. Alternatively the appropriate chlorothiocarbonate

where R is the desired fluoro substituted benzyl radical is reacted with the amine. The fluoro substituted benzyl thiolcarbamates, so produced, may be purified by distillation if desired and in the case of solid products by crystallization. The products are sufficiently pure for most purposes after stripping the solvent and other volatile constituents. It is preferred to strip by heating at 110–150° C. at 1–2 mm./Hg pressure to assure removal of any residual fluorobenzylhalide.

The condensation of 3-(alpha,alpha,alpha-trifluoromethyl)benzyl chloride with sodium 2,5-dimethyl-1-pyrrolidinecarbothiolate is performed as follows: To a solution comprising 14 grams (0.14 mole) of 2,5-dimethyl-1-pyrrolidine, 16 grams (0.1 mole) of 25% sodium hydroxide and 50 ml. of water at 0–10° C. is added 7.8 grams (0.11 mole) of 85% carbonyl sulfide in 10 minutes. There is then added in one portion 19.5 grams (0.1 mole) of 3-(alpha,alpha,alpha - trifluoromethyl)benzyl chloride and the reaction mixture is stirred at the indicated times and temperatures: first hour 0–5° C.; second hour 5–10° C.; third hour 10–15° C.; fourth hour 15–20° C.; fifth hour 20–25° C. and 18 hours at 25–30° C., after which 200 ml. of water and 500 ml. of ethyl ether are added and the mixture stirred 15 minutes. The water layer is separated and discarded. The ether layer containing the product is washed with water until the washings are neutral and then dried over $Na_2SO_4$. The ether and any unreacted 3 - (alpha,alpha,alpha - trifluoromethyl)benzyl chloride is removed by distillation in vacuo by heating to 140–150° C. at 1–2 mm. The 3-(alpha,alpha,alpha-trifluoromethyl)benzyl 2,5-dimethyl-1-pyrrolidinecarbothiolate is a liquid obtained in 100% yield.

3 - (alpha,alpha,alpha - trifluoromethyl)benyl diisopropylthiolcarbamate is prepared as follows: There is added 25 grams (0.35 mole) of 85% carbonyl sulfide in 45 minutes to an aqueous solution at 0–10° C. comprising 45 grams (0.45 mole) diisopropylamine, 48 grams (0.3 mole) 25% sodium hydroxide and 100 ml. of water followed by the addition in one portion of 58 grams (0.3 mole) of 3 - (alpha,alpha,alpha-trifluoromethyl) - benzyl chloride. The mixture is stirred for one hour at 0–10° C. and then is allowed to warm slowly to room temperature and stirred overnight after which 500 ml. of water and 300 ml. of ethyl ether are added. The mixture is stirred one hour, the organic-water layers are separated and the water layer is extracted with an additional 100 ml. of ethyl ether and then discarded. The ether extract is combined with the previously separated organic layer and the combined ether solution is washed with water until the washings are neutral, dried over $Na_2SO_4$ and filtered through clay. The ether is removed by heating in vacuo up to 80–90° C. at 1–2 mm. on a steam bath. The residue is 83 grams (87% yield) of a yellow oil which is distilled to give 3 - (alpha,alpha,alpha - trifluoromethyl)benzyl diisopropylthiolcarbamate as a colorless oil boiling at 120–125° C. at 0.2 mm. Hg, $N_D^{30}$ 1.4959. Analysis gives 4.21% N, 10.10% S, and 18.48% F compared to 4.39% N, 10.04% S, and 17.85% F calculated for $C_{15}H_{20}F_3NOS$.

In a similar manner, other fluoro substituted benzyl esters are prepared by selection of the proper amine and substituted benzyl halide. Representative esters are obtained, and their properties are shown in Table I. The compounds are insoluble in water and soluble in ether, acetone, chloroform, benzene, heptane and ethyl acetate.

of the pan, then a known number of seeds of velvetleaf, morningglory, lambsquarter, smartweed, *Bromus tectorum*, and barnyardgrass scattered across the pan. After the seeds are planted and pressed down with the tamper the pans are set aside until the time of chemical treatment and just prior to treatment a counted number of quackgrass rhizomes 3–4 in. long, Johnsongrass propagules and segments of Canada thistle roots 3–4 in. long are placed in the pan, the plants covered with 450 grams of soil containing the chemical to be tested. Two or more pans similarly planted are covered with untreated soil as controls. The treated and untreated pans are moved into the greenhouse where they are watered from below as needed.

Approximately two weeks after application of the test

TABLE I

| Compound | Yield, percent | Analysis, percent | | | | | | M.P., °C. | B.P., °C. |
|---|---|---|---|---|---|---|---|---|---|
| | | Calculated | | | Found | | | | |
| | | N | S | F | N | S | F | | |
| 3-(α,α,α-trifluoromethyl)benzyl 1-pyrrolidinecarbothiolate | 62 | | 11.08 | | | 11.39 | | | Liquid. |
| 4-fluorobenzyl diisopropylthiolcarbamate | 95 | 5.20 | 11.90 | 7.05 | 5.00 | 11.76 | 7.18 | 39–39.5 | 127–130/0.2 $N_D^{30}$ 1.5297. |
| 3-fluorobenzyl diisopropylthiolcarbamate | ¹ 99 | 5.20 | 11.90 | 7.05 | 5.27 | 11.78 | 7.19 | ² 72–73 | |
| 2-fluorobenzyl diisopropylthiolcarbamate | ³ 91 | 5.20 | 11.90 | 7.05 | 5.31 | 11.81 | 7.17 | ² 52–52.5 | |
| 3-fluorobenzyl diethylthiolcarbamate | 95 | | | 7.87 | | | 8.24 | | Amber liquid. |
| 4-fluorobenzyl 1-piperidinecarbothiolate | 99 | 5.53 | 12.66 | 7.50 | 5.58 | 12.35 | 7.74 | | Do. |
| 3-fluorobenzyl 1-piperidinecarbothiolate | ⁴ 87 | | 12.66 | 7.50 | | 12.38 | 8.05 | | Do. |
| 3-(α,α,α-trifluoromethyl)benzyl 1-piperidinecarbothiolate | ⁴ 76 | 4.62 | 10.57 | 18.79 | 4.66 | 10.40 | 18.65 | | Do. |
| 2-fluorobenzyl 1-piperidinecarbothiolate | ³ 92 | 5.53 | 12.66 | 7.50 | 5.61 | 12.49 | 7.50 | ² 60–61 | |
| 4-fluorobenzyl diethylthiolcarbamate | 99 | 5.80 | 13.29 | 7.87 | 5.75 | 13.45 | 7.71 | | Do. |
| 2-fluorobenzyl diethylthiolcarbamate | 87 | 5.80 | 13.29 | 7.87 | 6.06 | 13.11 | 7.63 | | Do. |
| 2-fluorobenzyl 1-pyrrolidinecarbothiolate | 100 | 5.85 | 13.40 | 7.94 | 5.63 | 13.40 | 7.78 | | Do. |
| 3-fluorobenzyl 1-pyrrolidinecarbothiolate | | 5.85 | 13.40 | 7.94 | 5.56 | 13.28 | 8.15 | | Do. |
| 4-fluorobenzyl 2,5-dimethyl-1-pyrrolidinecarbothiolate | 100 | 5.24 | 11.99 | 7.11 | 5.19 | 12.14 | 7.23 | | Do. |
| 2-fluorobenzyl 2,5-dimethyl-1-pyrrolidinecarbothiolate | 100 | 5.24 | 11.99 | 7.11 | 5.08 | 11.79 | 7.33 | | Do. |
| 3-fluorobenzyl 2,5-dimethyl-1-pyrrolidinecarbothiolate | 100 | 5.24 | 11.99 | 7.11 | 5.09 | 12.28 | 7.30 | | Do. |
| 4-fluorobenzyl 1-pyrrolidinecarbothiolate | | 5.85 | 13.40 | 7.94 | 5.88 | 13.60 | 8.02 | 56.0–56.5 | |
| 3-(α,α,α-trifluoromethyl)benzyl 2,6-dimethyl-1-piperidinecarbothiolate. | ⁴ 82 | 4.23 | 9.68 | 17.20 | 3.97 | 9.71 | 17.25 | | Do. |
| 3-(α,α,α-trifluoromethyl)benzyl N-allyl N-propylthiolcarbamate. | 98 | 4.41 | 10.10 | 17.96 | 4.25 | 10.15 | 18.30 | | 126–130/0.15. |
| 3-(α,α,α-trifluoromethyl)benzyl diethylthiolcarbamate | 89.5 | 4.81 | 11.01 | 19.57 | 4.84 | 11.17 | 19.59 | | 136–137/1.5 $N_D^{25}$ 1.5023. |
| 3-(α,α,α-trifluoromethyl)benzyl dimethylthiolcarbamate | 89.6 | 5.31 | 12.17 | 21.65 | 5.32 | 12.34 | 22.04 | | 85–88/0.1 $N_D^{25}$ 1.5106. |
| 3-(α,α,α-trifluoromethyl)benzyl dibutylthiolcarbamate | 95.5 | 4.03 | 9.23 | 16.40 | 3.79 | 9.18 | 16.53 | | 130–135/0.2 $N_D^{25}$ 1.4942. |
| 3-(α,α,α-trifluoromethyl)benzyl di-n-propylthiolcarbamate | 100 | 4.39 | 10.04 | 17.85 | 4.50 | 10.10 | 18.29 | | 151–152/1.0 $N_D^{25}$ 1.4968. |
| 3-(α,α,α-trifluoromethyl)benzyl diisobutylthiolcarbamate | 100 | 4.03 | 9.22 | 16.40 | 4.21 | 9.45 | 16.82 | | 157–160/1.0 $N_D^{25}$ 1.4914. |
| 4-fluorobenzyl diisobutylthiolcarbamate | 95 | 4.70 | 10.77 | 6.39 | 4.80 | 10.81 | 6.54 | | 130–131/0.15 $N_D^{25}$ 1.5166. |

¹ Ether removed in vacuo at 30° C. at 1–2 mm. and solid air-dried at 25.30° C.
² Recrystallized from heptane.
³ No ether used, added 500 ml. $H_2O$, stirred at 0.10° C. for one hour, filtered and air-dried at 25–30° C.
⁴ Stripped at 170° C. at 1–2 mm.

Pre-emergence tests are carried out employing viable seeds or vegetative propagules of representative plants which include narrowleaf perennials. The plant spectrum is as follows:

| Plant name | Plant family | Genus and species | |
|---|---|---|---|
| Canada thistle | Compositae | *Cirsuim* | *arvense.* |
| Cocklebur (common). | do | *Xanthium* | *pensylvanicum.* |
| Velvetleaf | Malvaceae | *Abutilon* | *theophrasti.* |
| Morningglory | Convolvulaceae | | *Ipomoea* |
| Lambsquarters | Chenopodiaceae | *Chenopodium* | *album.* |
| Smartweed | Polygonaceae | *Polygonum* | *pensylvanicum.* |
| Nutsedge | Cyperaceae | *Cyperus* | *esculentus.* |
| *Bromus tectorum* | Gramineae | *Bromus* | *tectorum.* |
| Johnsongrass | do | *Sorghum* | *halepense.* |
| Quackgrass | do | *Agropyron* | *repens.* |
| Barnyardgrass | do | *Echinochloa* | *crusgalli.* |

Vegetative propagules of Canada thistle, Johnsongrass and quackgrass are used, and the other species are planted as seeds.

An aluminum pan is level filled with soil and compacted to a depth of approximately ⅜ in. from the top by means of a template tamper. A known number of nutsedge nutlets and cocklebur are planted lengthwise chemical the results are observed and recorded. The number of plants of each species which germinated and grew are counted and converted to a herbicidal rating by means of a fixed scale based on average percent germination. The numbers of plants emerging are converted directly to herbicide ratings according to the fixed scale by comparison to the number of plants emerging from the seeds and propagules planted in the untreated control pans. Thus, based upon the number of plants which emerged from the untreated control the percentage of that number which emerged from similarly planted but chemically treated pans affords a measure of the herbicidal effectiveness. The rating scale is:

| Percent of control emerging: | Phytotoxicity rating |
|---|---|
| 0–25 | 3 |
| 26–50 | 2 |
| 57–75 | 1 |
| 76–100 | 0 |

Phytotoxicity ratings of representative fluorobenzyl thiolcarbamates which controlled quackgrass at 1 lb. per acre are recorded in Table II.

TABLE II.—PHYTOTOXIC PROPERTIES OF THIOLCARBAMATES

| Compound | Application rate | Canada thistle | Cocklebur | Velvetleaf | Morning-glory | Lambsquarter | Smartweed | Nutsedge | Quackgrass | Johnson grass | Bromus tectorum | Barnyardgrass |
|---|---|---|---|---|---|---|---|---|---|---|---|---|
| 4-fluorobenzyl diisopropylthiolcarbamate | 1 | | 0 | 0 | 0 | 1 | 1 | 3 | 3 | 0 | 3 | 3 |
| 3-fluorobenzyl diisopropylthiolcarbamate | 1 | | 0 | 0 | 1 | 0 | 0 | 3 | 3 | 0 | 3 | 3 |
| 2-fluorobenzyl diisopropylthiolcarbamate | 1 | | 1 | 0 | 1 | 0 | 2 | 3 | 3 | 0 | 3 | 3 |
| 3-fluorobenzyl diethylthiolcarbamate | 1 | 1 | 0 | 1 | 0 | 3 | 1 | 2 | 3 | 0 | 3 | 3 |
| 4-fluorobenzyl diethylthiolcarbamate | 1 | 0 | 0 | 2 | 0 | 0 | 1 | 3 | 3 | 1 | 3 | 3 |
| 2-fluorobenzyl diethylthiolcarbamate | 1 | 0 | 0 | 2 | 1 | 1 | 3 | 2 | 3 | 1 | 1 | 3 |
| 2-fluorobenzyl 2,5-dimethyl-1-pyrrolidinecarbothiolate | 1 | 1 | 0 | 0 | 0 | 1 | 2 | 3 | 3 | 1 | 3 | 3 |
| 3-($\alpha,\alpha,\alpha$-trifluoromethyl)benzyl-2,6-dimethyl-1-piperidinecarbothiolate | 1 | 0 | 0 | 2 | 2 | 1 | 1 | 2 | 3 | 3 | 2 | 1 |
| 3-($\alpha,\alpha,\alpha$-trifluoromethyl)benzyl diisopropylthiolcarbamate | 1 | | 0 | 0 | | 0 | 0 | 1 | 3 | 0 | 1 | 2 |

Comparison of unit activity on quackgrass and safety to crops at the effective rate is illustrated by results in Table III. Aluminum pans approximately 9 in. x 5 in. x 2½ in. with holes in the bottoms are filled with Ray silt loam leveled and compressed until the soil is about ⅝ in. below the top of the pans. Each pan is planted with six 4 inch sections of quackgrass rhizomes having at least four nodes each, 5 soybean seeds, 12 wheat seeds and alfalfa seed in a thickly planted row. The test chemicals are applied to 450 grams of soil contained in the same size aluminum pans without holes at various dosages ranging from ⅛ lb. per acre to 1 pound per acre or higher. Each chemical is applied at a dilution of 30 gallons per acre in the form of 1:1 acetone/water solution with a belt sprayer. The treated soil is mixed thoroughly after spraying to assure uniform distribution of the test chemical throughout the soil and used to cover the propagules and seeds. All pans receive 0.3 inch of overhead irrigation from a rain simulator.

Three different plantings treated with each test chemical are placed at different locations in the greenhouse and the results of the three tests averaged. Observations for percent weed inhibition and percent crop injury based on a scale of 0 to 100 where 0 represents no inhibition of weed top growth or crop injury and 100 represents complete weed inhibition or crop injury are made three weeks after treatment. Soil moisture is maintained by sub-irrigation. The minimum dosage at which a commercially acceptable level of quackgrass control is obtained together with the effect on crop plants are recorded in Table III.

benzyl thiolcarbamates are applied by pre-emergence application to the surface of the cover soil of pans planted with major narrowleaf weeds and the minimum rate for weed control observed from evaluation of tests over a range of dosages. Johnsongrass seeds are used in this case.

TABLE IV

| | Minimum rate, lbs./acre | |
|---|---|---|
| | 4-fluorobenzyldiethyl-thiolcarbamate | 2-fluorobenzyldiethyl-thiolcarbamate |
| *Bromus tectorum* | ½ | ½ |
| Foxtail | 1 | 1 |
| Johnsongrass | ½ | ½ |
| Bracharia | 1 | 2 |
| Panicum | ⅛ | ¼ |
| Crabgrass | ½ | ½ |
| Blackgrass | ⅛ | ⅛ |
| Wild oat | ¼ | ½ |
| Nutsedge | >2 | >2 |
| Wildcane | ¼ | ¼ |

Somewhat higher dosages are required for control of *Bromus tectorum* and of nutsedge by surface application than by incorporation into the cover soil. Selective control of crabgrass, sedges and barnyardgrass in rice is attained by surface application in the manner described above of 4 - fluorobenzyl diisopropylthiolcarbamate. At four pounds per acre, substantially no injury to rice is observed whereas nutsedge is controlled at two pounds

TABLE III.—CROP SELECTIVITY

[Percent inhibition after three weeks—average for three plantings]

| Compounds | Rate, #/a. | Quackgrass | Wheat | Soybean | Alfalfa | Corn [1] |
|---|---|---|---|---|---|---|
| 3-($\alpha,\alpha,\alpha$-trifluoromethyl)benzyl diisopropylthiolcarbamate | 1 | 95 | 0 | 0 | 3 | 0 |
| 4-fluorobenzyl diisopropylthiolcarbamate | ⅛ | 98 | 0 | 7 | 10 | 0 |
| 3-fluorobenzyl diisopropylthiolcarbamate | ¼ | 97 | 0 | 0 | 7 | 5 |
| 2-fluorobenzyl diisopropylthiolcarbamate | ⅛ | 83 | 0 | 10 | 10 | 10 |
| 3-fluorobenzyl diethylthiolcarbamate | ¼ | 83 | 0 | 7 | 0 | 8 |
| 4-fluorobenzyl diethylthiolcarbamate | ¼ | 100 | 0 | 10 | 0 | 5 |
| 2-fluorobenzyl diethylthiolcarbamate | ¼ | 97 | 3 | 7 | 0 | 5 |

[1] Corn tested at ½ lb./a. observed four weeks after planting.

Similar unit activity tests are carried out against yellow nutsedge (*Cyperus esculentus*). Ten tubers are planted in the above-described pans and the test chemical incorporated into the cover soil. Control of yellow nutsedge at ½ lb./acre is observed with either o, m or p-fluorobenzyl N,N-diisopropylthiolcarbamate. The percent inhibition at this dosage, average of 3 tests, is 98%, 91% and 91% respectively.

Other unit activity tests are carried out and the results observed 20 days after planting. Representative fluoroper acre, barnyardgrass at one pound per acre and crabgrass at one-fourth pound per acre.

The use of the fluorobenzyl thiolcarbamates in sugar beet culture is illustrated by unit activity tests in which the toxicant is incorporated in the cover soil employed in planting seeds of sugar beet, wheat and various annual weedy grasses. The maximum safe rate in lbs./acre on sugar beet and wheat and the minimum control rate on the weeds is determined in the manner described based upon observation made about three weeks after planting.

TABLE V.—SUGAR BEET CULTURE

| Compound | Maximum Safe rate, lbs./acre | | Minimum control rate, lbs./acre | | | |
|---|---|---|---|---|---|---|
| | Sugar beet | Wheat | Barn-yard Grass | Wild oat | *Bromus tectorum* | Black grass |
| 3-fluorobenzyl diethylthiolcarbamate | 2 | 1 | ½ | ½ | ¼ | ¼ |
| 4-fluorobenzyl diethylthiolcarbamate | >4 | 2 | ½ | ½ | ¼ | <⅛ |
| 2-fluorobenzyl diethylthiolcarbamate | 2 | 1 | ½ | 1 | ¼ | <⅛ |
| 3-fluorobenzyl N,N-diisopropylthiolcarbamate | >4 | ¼ | ½ | <⅛ | <⅛ | <⅛ |
| 4-fluorobenzyl N,N-diisopropylthiolcarbamate | >4 | ½ | ½ | ¼ | <⅛ | <⅛ |
| 3-(alpha,alpha,alpha-trifluoromethyl)benzyldiisopropylthiolcarbamate | >4 | 1 | 2 | ½ | 1 | ½ |

The fluorobenzyl thiolcarbamates are insoluble in water but soluble in common organic solvents. They may be dispersed directly in water or a solution in an organic solvent emulsified in aqueous medium by the aid of a dispersing agent. The usual mode of application is in the form of a spray containing the active ingredient in a concentration within the range of 0.01–10% by weight at a dosage within the range of 1/16 to 5 pounds per acre. Emulsifiable concentrates may be prepared which are diluted with water and applied to soil surface or incorporated into the top soil layer.

As dispersing and wetting agents there may be employed soft or hard sodium or potassium soaps, alkylated aromatic sodium sulfonates such as sodium dodecylbenzene sulfonate, amine salts as for example, dibutylammonium dodecylbenzenesulfonate, alkali metal salts of sulfated fatty alcohols, ethylene oxide condensation products of alkyl phenols and other dispersing and wetting agents and mixtures thereof. Formulation of dry compositions is accomplished by mixing with finely divided solid carriers. Suitable carriers comprise talc, clay, pyrophyllite, silica and fuller's earth. A dry formulation may be applied as a dust or dispersed in aqueous medium. If the latter is intended the addition of a wetting or dispersing agent is advantageous.

In general, herbicidal compositions are formulated with the aforesaid toxicants as essential active ingredients in minor or major proportion together with herbicidal adjuvant as carrier in accordance with the table below. Surface active agent is usually present except in the case of granules.

Type of formulation: Concentration of active ingredient, percent
(1) Granules of relatively large particle size _____ 5–50
(2) Powdery dusts _____ 2–90
(3) Wettable powders _____ 2–90
(4) Emulsifiable concentrates _____ 5–95
(5) Solutions _____ .01–95
(6) One of the less common types of formulations depending on the desired mode of application _____ .01–95

The compounds may, if desired, be used in combination with other agricultural chemicals such as fertilizers, insecticides, fungicides, nematocides and other herbicides. Two or more herbicides may be combined to obtain specificity for different species of undesired plants and to obtain mutually activating effects. Examples of other herbicides which may be used in combination are N - (1,1 - dimethylpropynyl)-3,5-dichlorobenzamide, 5-amino-4-chloro-2-phenyl-3(2H)-pyridazinone; 4-(methylsulfonyl)-2,6-dinitro-N,N-dipropylaniline; alkyl thiolcarbamates, for example ethyl N-cyclohexyl N-ethylthiolcarbamate, propyl N - ethyl - N-n-butylthiolcarbamate, mono-, di- and tri-chloroallyl diisopropylthiolcarbamate; triazines, for examples, 2-t-butylamino-4-methylamino-6-methylthio-s-triazine, 2 - chloro-4-ethylamino-6-isopropylamino-s-triazine, 2 - t-butylamino-4-ethylamino-6-methylthio-s-triazine, 2 - (4 - chloro-6-ethylamino-s-triazin-2-yl-amino)-2-methylpropionitrile, 2 - chloro-4,6-bis(isopropylamino)-s-triazine; the chloroacetanilides, for example, 2',6'-diethyl-N-methoxymethyl-2-chloroacetanilide, N-iso-propyl-2-chloroacetanilide; α,α,α-trifluoro-2,6-dinitro-N,N-dipropyl-p-toluidine; ureas, for example 3-(3,4-dichlorophenyl)-1-methoxy-1-methylurea, 3 - (4-bromo-3-chlorophenyl)-1-methoxy-1-methylurea, and 3 - (3,4-dichlorophenyl)-1,1-dimethylurea.

The preferred method of application is to apply the toxicant prior to planting the crop and incorporate it into the top soil. Useful results are also obtained by applying to the soil surface after planting either before the crop emerges or in the case of cultivated crops as a band along the rows. The use in bands or strips may be either a pre-plant or a post-plant application. In addition to use in field crop culture the new compounds are also useful for the control of weedy grasses in greenhouses.

Post-emergence chemicals can be applied later, if desired, for example the carbamates, 3-(methoxycarbonylaminophenyl) - N - (3 - methylphenyl)carbamate or 4-chloro-2-butynyl-N-3-chlorophenylcarbamate.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The method of controlling undesired vegetation which comprises applying to the soil medium a toxic concentration of a compound of the formula

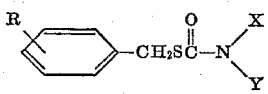

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

2. The method of controlling quackgrass which comprises applying to the soil medium containing vegetative propagules thereof a toxic concentration of a compound of the formula

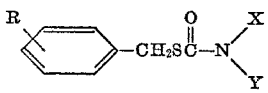

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

3. The method for the selective control of perennial and annual grasses in crop plants which comprises applying to the soil medium of the crop a concentration toxic to undesired grasses but substantially innocuous to the crop of a compound of the formula

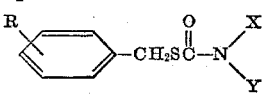

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

4. The method of claim 3 where X and Y are alkyl of 2 or 3 carbon atoms.

5. The method of claim 3 where X and Y taken together with the nitrogen is 1-piperidinyl.

6. The method of claim 4 where R is in the 3 position and X and Y are isopropyl.

7. The method of claim 5 where R is trifluoromethyl in the 3 position.

8. The method of controlling Cyperaceae which comprises applying to the soil medium containing vegetative propagules thereof a toxic concentration of a compound of the formula

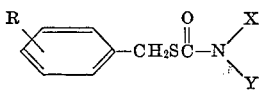

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

9. The method for the selective control of nutsedge in crop plants which comprises applying to the soil medium of the crop a concentration toxic to nutsedge but substantially innocuous to the crop of a compound of the formula

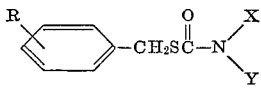

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

10. Herbicidal composition comprising an inert herbicidal adjuvant as carrier, a surface active agent and a phytotoxic concentration of a compound of the formula

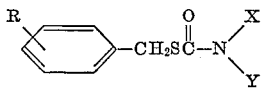

where R is trifluoromethyl, X and Y individually are lower alkyl or allyl or taken together with the nitrogen are 1-pyrrolidinyl, dimethyl-1-pyrrolidinyl, 1-piperidinyl or dimethyl-1-piperidinyl.

11. A composition of claim 10 where X and Y are alkyl of 2 or 3 carbon atoms.

12. The method of claim 3 wherein the crop plant is corn.

13. The method of claim 3 wherein the crop plant is sugar beets.

14. The method of claim 3 wherein the crop plant is soybeans.

15. The method of claim 3 wherein the crop plant is alfalfa.

16. The method of claim 3 wherein the crop plant is wheat.

17. The method of claim 9 wherein the crop plant is corn.

18. The method of claim 9 wherein the crop plant is soybeans.

19. The method of claim 9 wherein the crop plant is sugar beets.

References Cited
UNITED STATES PATENTS

| | | | |
|---|---|---|---|
| 2,992,091 | 7/1961 | Harman et al. | 71—100 |
| 3,078,153 | 2/1963 | Harman et al. | 71—101 |

FOREIGN PATENTS

| | | | |
|---|---|---|---|
| 916,568 | 1/1963 | Great Britain | 71—100 |

LEWIS GOTTS, Primary Examiner

G. HOLLRAH, Assistant Examiner

U.S. Cl. X.R.

71—92, 93, 95, 100; 260—293.85, 326.3, 455 A